(12) United States Patent
Lee et al.

(10) Patent No.: US 8,705,043 B2
(45) Date of Patent: Apr. 22, 2014

(54) HEIGHT MEASUREMENT BY CORRELATING INTENSITY WITH POSITION OF SCANNING OBJECT ALONG OPTICAL AXIS OF A STRUCTURED ILLUMINATION MICROSCOPE

(75) Inventors: Chau-Hwang Lee, Hsin-Dian (TW); Chun-Chieh Wang, Da-Li (TW)

(73) Assignee: Academia Sinica, Taipei (TW)

( * ) Notice: Subject to any disclaimer, the term of this patent is extended or adjusted under 35 U.S.C. 154(b) by 763 days.

(21) Appl. No.: 12/966,207

(22) Filed: Dec. 13, 2010

(65) Prior Publication Data

US 2011/0141483 A1 Jun. 16, 2011

Related U.S. Application Data

(60) Provisional application No. 61/286,098, filed on Dec. 14, 2009.

(51) Int. Cl.
*G01B 9/021* (2006.01)
*G01B 11/24* (2006.01)
*G01B 11/30* (2006.01)

(52) U.S. Cl.
USPC .......................................... 356/457; 356/603

(58) Field of Classification Search
USPC .................... 356/457, 458, 603–605
See application file for complete search history.

(56) References Cited

U.S. PATENT DOCUMENTS

| 7,894,136 B2 * | 2/2011 | Betzig ............................. 359/577 |
| 2008/0266548 A1 * | 10/2008 | Lee et al. ......................... 356/73 |
| 2009/0046164 A1 * | 2/2009 | Shroff et al. ................. 348/222.1 |
| 2009/0161203 A1 * | 6/2009 | Kempe et al. ................. 359/368 |

OTHER PUBLICATIONS

Lin et al. "Wide-field super-resolution optical sectioning microscopy using a single spatial light modulator"; J. Opt. A: Pure Appl. 11:1-6 (2009).
Schermelleh et al. "Subdiffraction Multicolor Imaging of the nuclear periphery with 3D structured illumination microscopy" Science 320:1332-1336 (2008).
Gustafsson et al. "Three-dimensional resolution doubling in widefield fluorescence microscopy by structured illumination"; Biophysical Journal, 94:4957-4970 (2008).
Ilev et al. "Simple fiber-optic confocal microscopy with nanoscale depth resolution beyond the diffraction barrier"; 78:1-4 (2007).
Lee et al.; "Noninterferometric differential confocal microscopy with 2-nm depth resolution" 135:233-237 (1997).
Rosenfeldt et al.; "Nondestructive remote imaging of ferroelectric domain distributions with high three-dimensional resolution"; Appl. Phys. B73:523-529 (2001).
Lee et al. "Noninterferometric wide-field optical profilometry with nanometer depth resolution"; 27(20):1773-1775 (2002).

* cited by examiner

*Primary Examiner* — Hwa Lee
(74) *Attorney, Agent, or Firm* — Cesari and McKenna, LLP

(57) ABSTRACT

A method for imaging an object using a microscope includes obtaining axial response data, the axial response data representative of a relationship between a separation between a top surface of the object and an objective lens of the microscope and an intensity of light reflected by the top surface of the object; positioning the object at a distance from the objective lens that is within a linear region of the axial response data; sequentially illuminating the object with a plurality of periodic patterns; obtaining a plurality of images of the object, each image resulting from the illumination of the object with a corresponding one of the plurality of periodic patterns; determining a reconstructed image of the object based on the plurality of images of the object; and, based on variations in the intensity of the reconstructed image, determining a topographic profile of the top surface of the object.

1 Claim, 5 Drawing Sheets

US 8,705,043 B2

HEIGHT MEASUREMENT BY CORRELATING INTENSITY WITH POSITION OF SCANNING OBJECT ALONG OPTICAL AXIS OF A STRUCTURED ILLUMINATION MICROSCOPE

CROSS REFERENCE TO RELATED APPLICATIONS

This application claims priority to U.S. Provisional Application No. 61/286,098, filed Dec. 14, 2009. The content of the prior application is hereby incorporated by reference in its entirety.

FIELD OF THE INVENTION

This invention relates to optical surface profilometry.

BACKGROUND

High resolution surface profilometry plays an important role in nanoscience and biological research. For instance, atomic force microscopy (AFM) can be used to study biomolecular activities in real time. Direct optical imaging techniques are also useful in biological research because of their capabilities in wide-field imaging and non-contact measurement. However, the lateral resolution of optical imaging systems is generally limited by diffraction to about $0.5\lambda$, where $\lambda$ is the wavelength of the imaging light.

Structured illumination microscopy (SIM) is an optical imaging technique with improved lateral resolution. In SIM, a periodic excitation pattern is projected onto a sample. Multiple images are taken with the modulating pattern shifted to different positions transversely to the optical axis. The modulated illumination patterns are eliminated from the collected images by the mathematical combination of multiple images, enabling the recovery of high spatial frequency information and the formation of high resolution images. Linear SIM provides a lateral resolution of about $0.25\lambda$ for fluorescence microscopy; even higher resolution is achievable with saturated SIM. Fluorescence SIM with axially sectioning ability also provides a resolution of about $0.25\lambda$ for one-dimensional or two-dimensional structured imaging.

Fluorescence SIM using a liquid-crystal spatial light modulator (SLM) simplifies the configuration of the microscopy system and improves the stability and imaging speed of the system. In one SIM algorithm, five images are used, with the modulating mesh pattern at a different position in each image, to obtain a fluorescence image with a lateral resolution of $0.3\lambda$ and an axial resolution of $0.38\lambda$.

SUMMARY

In a general aspect, a method for imaging an object using a microscope includes obtaining axial response data, the axial response data representative of a relationship between a separation between a top surface of the object and an objective lens of the microscope and an intensity of light reflected by the top surface of the object; positioning the object at a distance from the objective lens that is within a linear region of the axial response data; sequentially illuminating the object with a plurality of periodic patterns; obtaining a plurality of images of the object, each image resulting from the illumination of the object with a corresponding one of the plurality of periodic patterns; determining a reconstructed image of the object based on the plurality of images of the object; and, based on variations in the intensity of the reconstructed image, determining a topographic profile of the top surface of the object.

Embodiments may include one or more of the following. The plurality of periodic patterns includes interference patterns generated by a plurality of lasers. Sequentially illuminating the object includes adjusting an optical path length of at least one of the plurality of lasers.

Sequentially illuminating the object with a plurality of periodic patterns includes illuminating the object through a mesh pattern, changing the position of the mesh pattern, and illuminating the object through the repositioned mesh pattern. Changing the position of the mesh pattern includes at least one of translating and rotating the pattern.

Sequentially illuminating the object with a plurality of periodic patterns includes generating a pattern using an electro-optic spatial light modulator, such as a liquid-crystal spatial light modulator.

The linear region of the axial response data includes a region of the data in which the relationship between the separation of the top surface of the object and the objective lens and the intensity of the reflected light is substantially linear. The plurality of images of the object are obtained without changing the separation between the top surface of the object and the objective lens of the microscope.

In another general aspect, a method for imaging an object using a microscope includes obtaining a plurality of images of the object, each image corresponding to a different separation between a top surface of the object and an objective lens of the microscope; for each of a plurality of lateral positions on the top surface of the object, identifying a separation between the top surface of the object and the objective lens at which the intensity of the image at that lateral position is maximum; and, based on the identified separations, determining a topographic profile of the top surface of the object.

Embodiments may include one or more of the following. The separation at which the intensity of the image is maximum corresponds to an overlap between the top surface of the sample and a focal plane of the objective lens. The topographic profile is further determined based on axial response data representative of a relationship between a separation between the top surface of the object and the objective lens of the microscope and an intensity of light reflected by the top surface of the object. Obtaining a plurality of images of the object includes obtaining at least ten images of the object.

In another general aspect, height measurement using structured illumination sectioning microscopy is achieved by searching the axial position of the maximum intensity (peak) of the axial response curve on each lateral position. By moving the sample and taking tens of optically sectioned images along the optical axis (z-axis) for a long distance, then recording the axial positions as each lateral position arriving its maximum intensity. The maximum intensity arrived when the sample surface was overlapped with the focal plane of the objective on the z-axis. Therefore, one can obtain the relative height of the sample surface on the x-y plane by using this method.

In a further general aspect, height measurement using structured illumination sectioning microscopy is achieved with the differential height measurement concept. This method is suitable for rapidly measuring the sample as the surface height variations are within the width of the intensity axial response curve. Moving the sample surface into the linear region of the axial response curve of the sectioning microscopy when one wants to measure the sample surface profile. In this linear region, the image intensity is linearly correlated to the height variation of the sample. Therefore, when we obtain the linear relation of the axial response curve (can memorize it into the computer database), the sample surface profile can be immediately translated from the intensity variations of the image without doing any z-axis scanning process.

Among other advantages, the microscopy techniques described herein allow optical imaging and profilometry with a lateral resolution smaller than the optical diffraction limit and a depth profiling accuracy of less than 10 nm. Such high resolution is useful for a number of applications, including visualization of real-time biological processes and the imaging of complex nanostructures. These techniques can be implemented in a straightforward setup.

Other features and advantages of the invention are apparent from the following description and from the claims.

DETAILED DESCRIPTION

Bright-field optical nano-profilometry with sub-diffraction limit lateral resolution can be achieved using structured illumination microscopy (SIM) with axial sectioning. In SIM, a periodic excitation pattern is projected onto a specimen. High spatial frequency information about the specimen can be collected into the optical transfer function of the imaging system. The combination of multiple images, such as five images, each with the modulating excitation patterned positioned at a different position with respect to the optical axis of the imaging system, enables a lateral resolution of $0.3\lambda$ and an axial resolution of $0.38\lambda$ to be achieved. SIM is described in greater detail in "Wide-field super-resolution optical sectioning microscopy using a single spatial light modulator," J. Opt. A: Pure Appl. Opt. 11, 015301 (2009), the contents of which are incorporated herein by reference. By performing axial sectioning simultaneously with SIM imaging, both a high resolution image and an accurate topographical profile of a specimen can be obtained.

Figure 1:
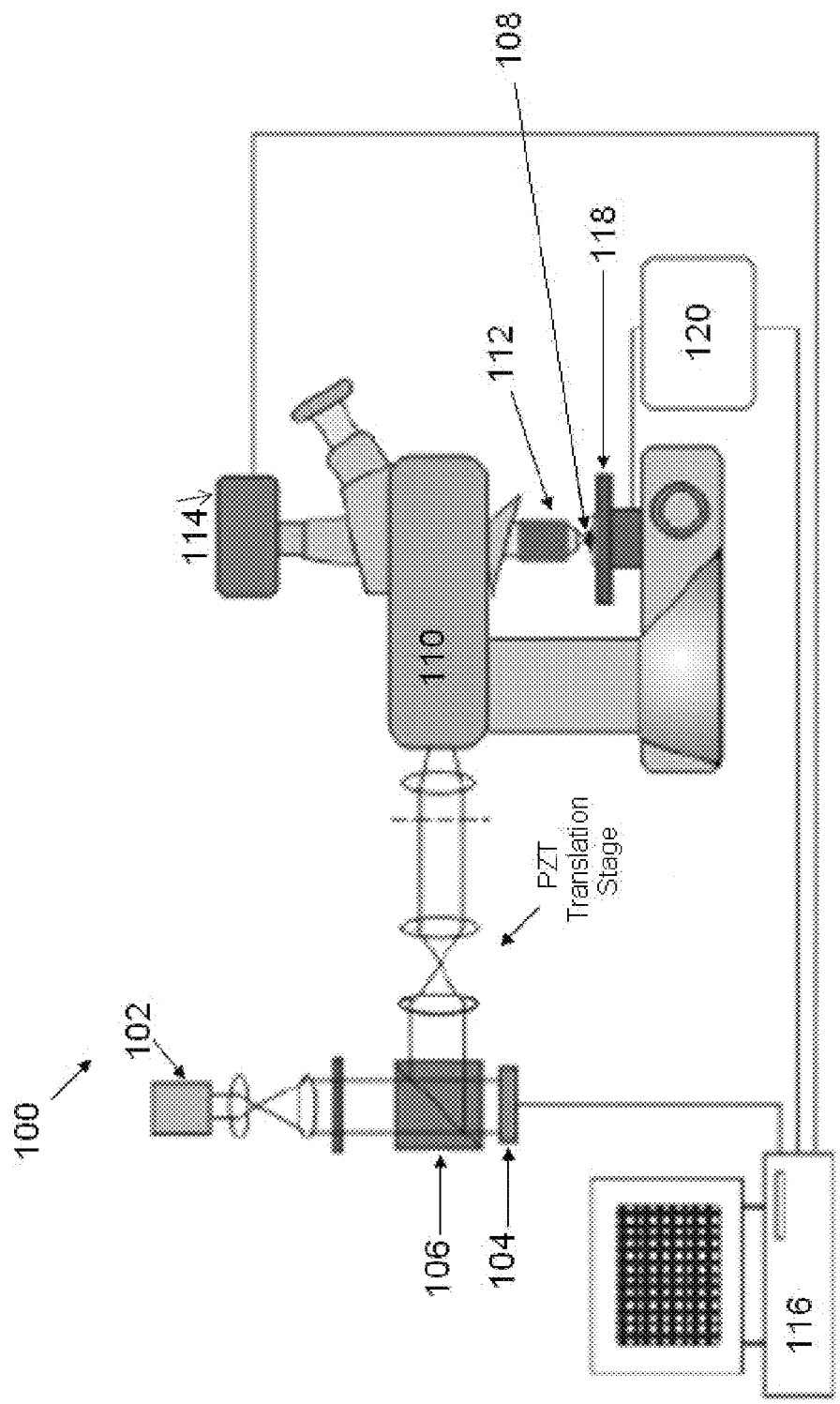
FIG. 1 is a schematic diagram of an optical nano-profilometry system.

Referring to FIG. 1, a specimen 108 is imaged with a structured illumination microscopy system 100 that includes a light source 102, such as a power-regulated mercury lamp, a solid-state laser, or a light emitting diode. An electro-optic spatial light modulator, such as a liquid crystal (LC) spatial light modulator 104, and a polarization beam splitter 106 generate a two-dimensional excitation pattern. For instance, the excitation pattern may be a mesh pattern with a period of 1.1 $\mu m^{-1}$ when projected onto specimen 108. The patterned illumination light enters a microscope 110, which may be a conventional wide-field optical microscope, and is focused onto specimen 108 by a high numerical aperture (NA) objective lens 112. The image reflected from specimen 108 is captured by a CCD camera 114 or other image recording device (e.g., an electron multiplying CCD camera, an intensified CCD camera, or a CMOS camera), and processed by a computer 116.

Specimen 108 is disposed on a stage capable of vertical motion, such as a piezoelectric transducer (PZT) stage 118 controlled by a PZT driver 120. In another embodiment, the sample is positioned on a stage controlled by a stepping or DC motor configured to change the position of the sample along the optical axis of microscope 110.

To obtain high lateral resolution, multiple SIM images are collected, each image corresponding to a different position of the excitation pattern relative to the optical axis of microscope 110. For instance, the excitation pattern may be translated or rotated with respect to the optical axis. The number of SIM images used for the reconstruction of a high resolution image of the specimen is determined by a processing algorithm used by computer 116. In general, any image acquisition and processing algorithm that is capable of allowing simultaneous acquisition of a high lateral resolution image and a high accuracy topographic profile of the specimen may be used.

In exemplary structured illumination microscope 100, the illumination pattern generated by LC spatial light modulator 104 can be shifted transversely relatively to the optical axis of microscope 110 in real time, shortening the image acquisition time. In another embodiment, instead of LC spatial light modulator 104, a two-dimensional mesh illumination pattern is generated from an interference pattern between beams from two or more lasers. The illumination pattern is shifted by adjusting the optical path lengths of one or more of the laser beams. In another embodiment, a two-dimensional mesh illumination pattern is achieved by installing a fixed mesh pattern into the illumination path of structured illumination microscope 100 and projecting the pattern onto the surface of specimen 108. The spatial position or orientation of the pattern can be changed by translating or rotating the installed pattern using a translation or rotation stage.

Figure 2:
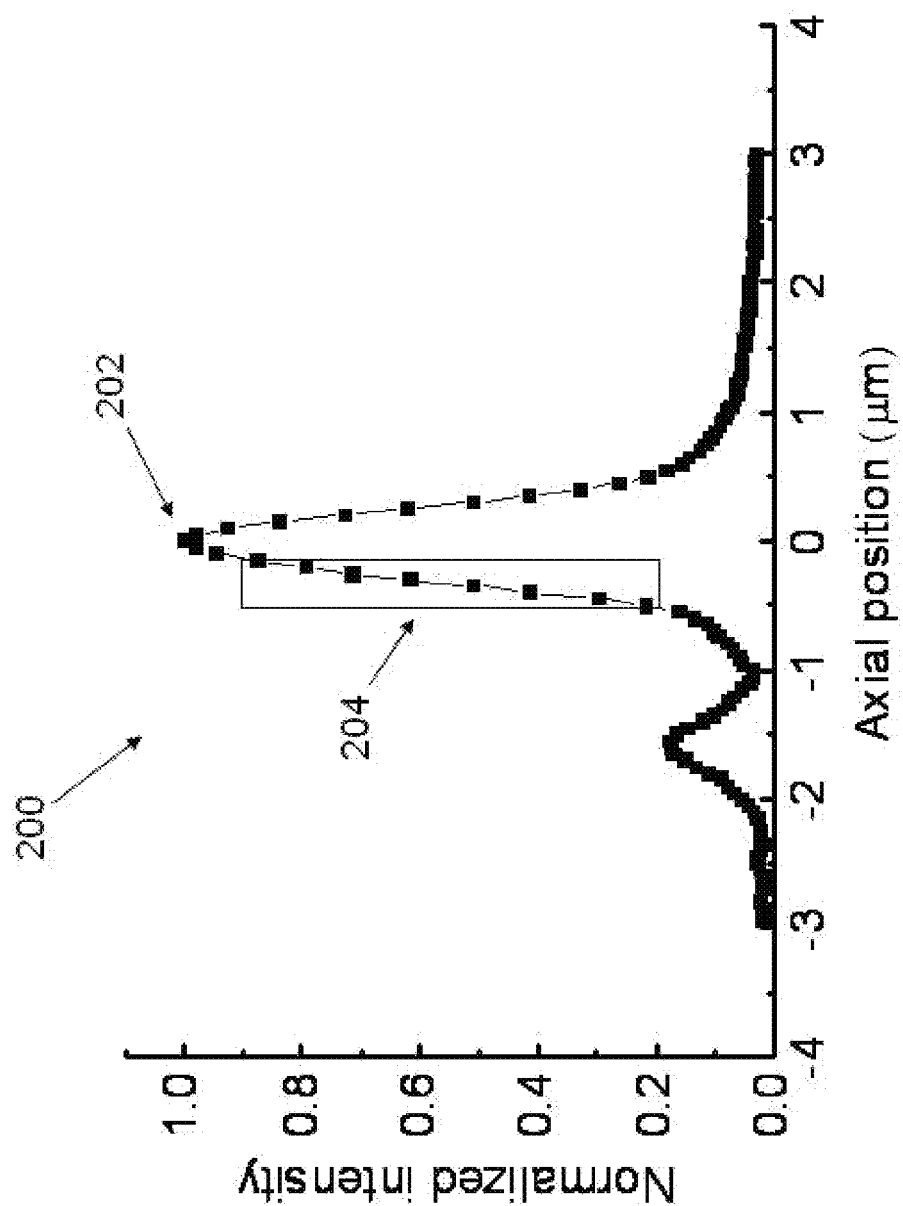
FIG. 2 is an axial response curve of a structured illumination microscope.

Referring to FIGS. 1 and 2, in axially sectioning SIM, an axial response curve 200 relates the position of specimen 108 along the optical axis of microscope 110 with the intensity of the resulting image. A peak 202 of axial response curve 200 corresponds to the position of specimen 108 at which the focal plane of objective lens 112 overlaps with the top surface of specimen 108.

In one embodiment, peak 202 of axial response curve 200 is used to localize the height of the top surface of specimen 108. Specimen 108 is scanned along the optical axis of objective lens 112 (defined as the z-axis of the system) for a sufficiently long distance, such as several microns. The axial position (i.e., the height) of the specimen at which a maximum reflected intensity is obtained is recorded for each lateral (x-y) position of the specimen. The recorded heights represent a topographic profile of the top surface of specimen 108 in the x-y plane. The dynamic range of measurement in this embodiment is limited only by the axial travelling distance of stage 118, but the method is slow because of the large number of images that are collected.

In a second embodiment, a surface profile of specimen 108 is obtained using differential height measurement. This embodiment is preferable for the rapid measurement of specimens with surface height variations smaller than the width of axial response curve 200. In this embodiment, the top surface of specimen 108 is positioned at a distance from objective lens 112 that places the specimen in a linear region 204 of axial response curve 200. In linear region 204, the signal intensity is proportional to the height of specimen 108. The linear region of axial response curve 200 may, for instance, be stored as a database. The surface profile of specimen 108 can be determined referring to the intensity values in the stored axial response curve data without performing any z-axis scanning of the specimen. The intensity of each pixel of an image of specimen 108 can thus be directly correlated to the height of the specimen at that location, without performing any z-axis scanning of the specimen.

In this embodiment, if the surface of specimen 108 is of heterogeneous reflectivity, a reference image can be acquired when the sample is placed on the focal plane. This reference image carries only the signal variation from the heterogeneous reflectivity. The actual height variations can thus be obtained by dividing the image intensity captured in the linear region by the image intensity in the reference image.

The above two methods can both be used in the axially sectioning SIM to achieve sub-diffraction-limit surface profilometry with depth profiling accuracy better than 10 nm.

Example 1

Figure 3B:
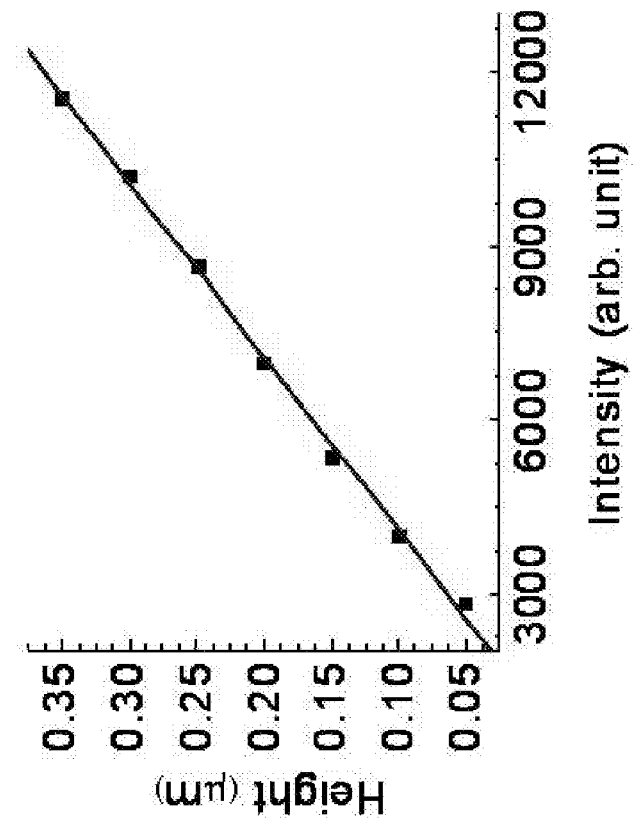
FIG. 3b is a graph of the linear region of the axial response curve of the sample of FIG. 3A.
Figure 3A:
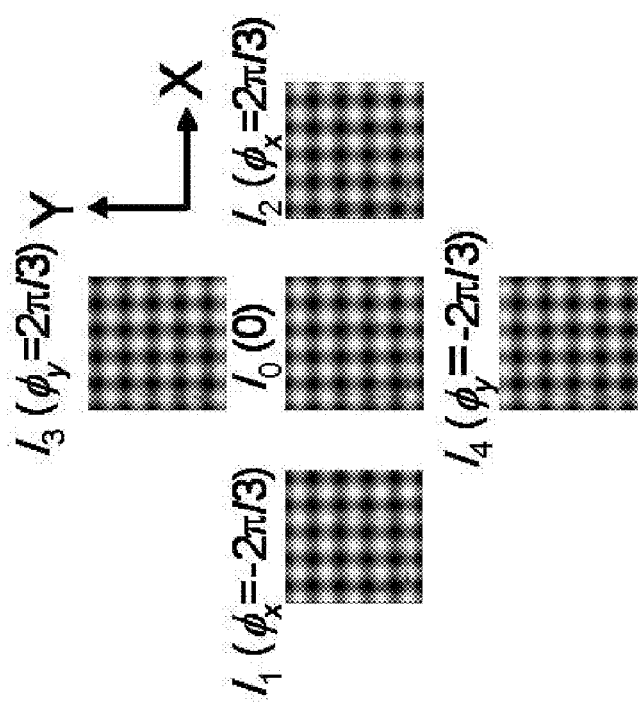
FIG. 3a is a set of images obtained by illuminating a sample with a mesh pattern.

Referring to FIG. 3a, a SIM system was used to reconstruct an axially sectioned super-resolution image of a mesh pattern. A 100×, 1.1 NA water-immersion objective with a lateral resolution of 260 nm at an illumination wavelength of 475 nm was used. An electron-multiplying CCD camera captured the resulting images. A mesh pattern was projected onto a reflective mirror, generating a pattern with a period of 0.5 µm on the mirror surface. The mesh pattern was placed at five different positions, each position having a different modulated intensity I and phase $\phi_x$, $\phi_y$, generating five images $I_0$-$I_4$. A super-resolution image was reconstructed from the five images using an image processing algorithm. The mirror was then scanned along the z-axis of the SIM system (i.e., along the axis of the illumination light).

Super-resolution images were reconstructed as described above for seven height positions of the mirror. Referring to FIG. 3b, a linear relationship is seen between the height of the mirror and the intensity of the corresponding super-resolution image. The deviation between the measured intensity (black squares) and the linear fit to the data (black line) corresponds to a depth accuracy of 6 nm.

Example 2

Figures 4A, 4B, 4C:
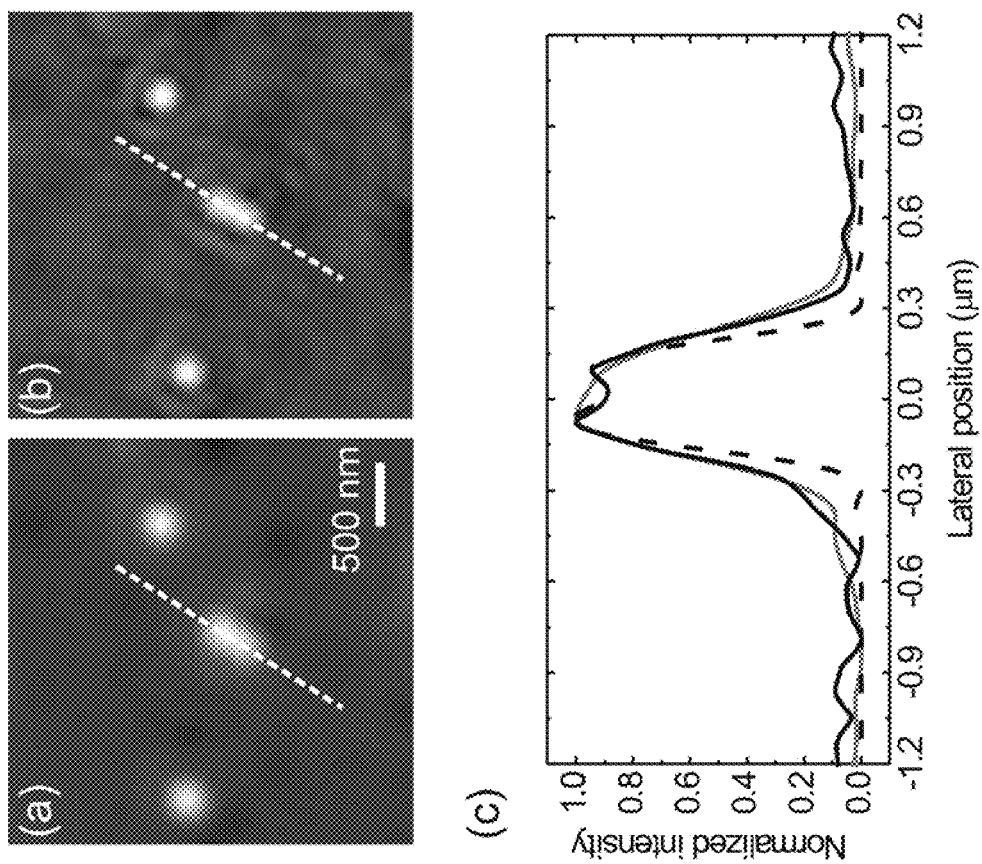
FIG. 4a is a conventional bright-field microscopy image of four 80 nm gold particles on a glass substrate.
FIG. 4b is an image of the particles in FIG. 4A obtained by structured illumination microscopy.
FIG. 4c is a graph of line profiles along the dashed white lines in the images of FIGS. 4A (gray curve) and 4B (black curve). The dashed curve represents the summation of two Airy formulas separated by 190 nm.

Referring to FIGS. 4a and 4b, a conventional bright-field microscopy image of four 80 nm gold particles on a glass substrate and a corresponding super-resolution image obtained by SIM are shown. The surface of the glass substrate was placed at the focal plane of the SIM to demonstrate the bright-field super-resolution capability.

Referring to FIG. 4c, line profiles corresponding to the dashed white lines in FIGS. 4a (gray curve) and 4b (black curve) are shown. An intensity dip is observed in the profile obtained from the SIM image, indicating that two adjacent 80 nm particles can be resolved using SIM. Conventional bright-field microscopy does not resolve the two adjacent particles.

The Airy formula, $I(r)=[2J_1(r)/r]^2$, where $J_1$ is the $1^{st}$ order Bessel function of the first kind, is used to estimate the distance between the two particles. The intensity dip can be fitted by the summation of two Airy formulas of 175 nm width (FWHM) and separated by 190 nm. The summation is shown as the dashed curve in FIG. 4c. After deconvolving the particle diameter (80 nm), a lateral resolution of 155 nm is obtained, which is about 33% of the illumination wavelength.

Example 3

Figures 5A, 5B, 5C, 5D:
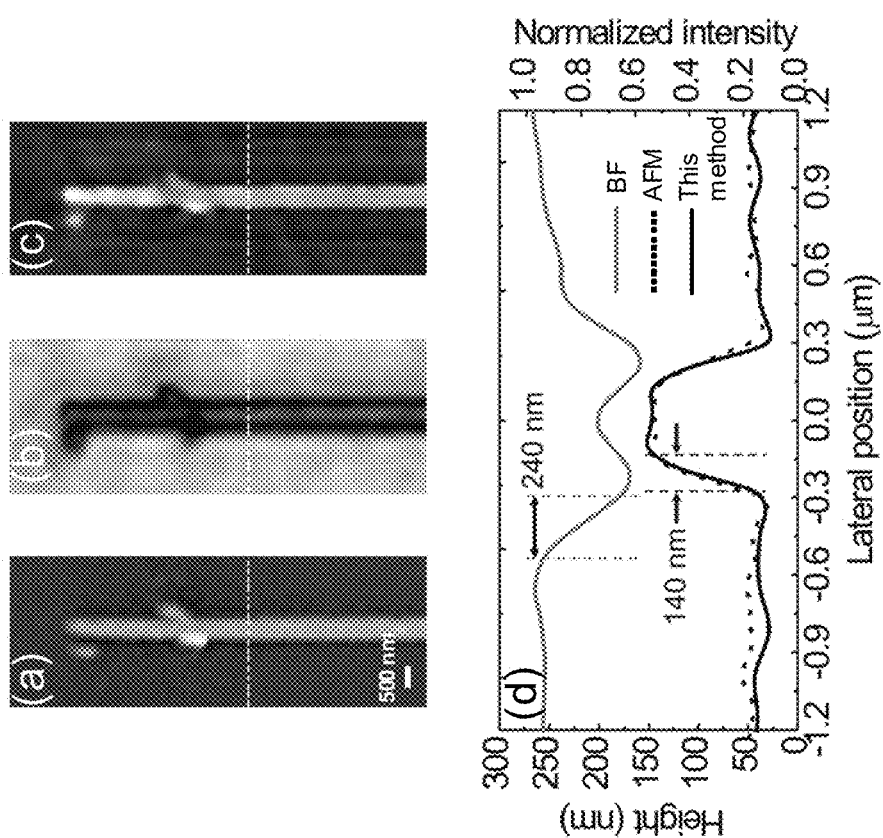
FIGS. 5a-5c are an atomic force microscopy topography image, a conventional bright-field microscopy image, and a structured illumination microscopy image, respectively, of a gold wire on a silicon substrate.
FIG. 5d is a graph of line profiles along the dashed lines of FIGS. 5A (dashed curve), 5B (gray curve), and 5C (black curve).

A gold wire is used to demonstrate the depth profiling accuracy of SIM. This wire was fabricated by using electron-beam lithography and a lift-off process on a silicon substrate. Referring to the AFM topography image in FIG. 5a, the width and height of the wire are 450 nm and 115 nm, respectively. A conventional bright-field image of the wire, shown in FIG. 5b, gives a width of about 770 nm due to diffraction effects. The edge response from 10% to 90% of the intensity variation on the wire is about 240 nm, close to the optical resolution of the objective (260 nm). The scattering from the edges of the wire makes a dark outline in the bright-field image. The effect of scattering or inhomogeneous reflectivities can be removed by dividing image intensity obtained in the linear region of the axial response curve with the image intensity obtained on the focal plane.

After the calibration of the signal intensity to the height variations, the super-resolution topography of the gold wire is obtained, as shown in FIG. 5c. The gray levels represent a range of heights from 0 to 200 nm.

FIG. 5d shows that the edge response of this wire is ~140 nm, corresponding to about 30% of the illumination wavelength. The height measured by SINAP is ~120 nm, close to that measured by AFM.

It is to be understood that the foregoing description is intended to illustrate and not to limit the scope of the invention, which is defined by the scope of the appended claims. Other embodiments are within the scope of the following claims.

What is claimed is:

1. A method for height measurement of an object using structured illumination sectioning microscopy, comprising:
    moving the object along an optical axis of a microscope configured for structured illumination sectioning microscopy for a long distance;
    obtaining a plurality of optically sectioned images as the object is moved along the optical axis of the microscope;
    recording the positions of the object along the optical axis as each lateral position in the images of the object arrives at a maximum intensity, wherein the maximum intensity corresponds to a position at which a surface of the object overlaps with a focal plane of an objective lens of the microscope along the optical axis; and
    obtaining relative heights of the surface of the object in the plane of the surface of the object.

* * * * *